United States Patent
Stapley

[11] 3,758,176
[45] Sept. 11, 1973

[54] BEARING PACK
[75] Inventor: Derek E. Stapley, Rockford, Ill.
[73] Assignee: Sundstrand Corporation, Rockford, Ill.
[22] Filed: Nov. 19, 1971
[21] Appl. No.: 200,419

[52] U.S. Cl............................................. 308/6 C
[51] Int. Cl. ........................................... F16c 29/06
[58] Field of Search .................................. 308/6 C

[56] References Cited
UNITED STATES PATENTS

| | | | |
|---|---|---|---|
| 3,608,985 | 9/1971 | Swanson | 308/6 C |
| 3,003,828 | 10/1961 | Stark | 308/6 C |
| 3,357,753 | 12/1967 | Ionov | 308/6 C |
| 3,101,978 | 8/1963 | Stallman | 308/6 C |

Primary Examiner—Charles J. Myhre
Assistant Examiner—Barry Grossman
Attorney—Hofgren et al.

[57] ABSTRACT

A bearing pack for load support of moving parts wherein a plurality of rolling elements, and more particularly roller bearings, are mounted for travel along a load zone and a return path with the load zone and a major part of the return path being defined by a body member of one-piece construction. A pair of end caps extend from the body member and each have a curved guide channel interconnecting the load zone and the return path to provide a complete circuit for the rolling elements whereby the body member may be constructed of an easily machined shape and material to provide the necessary strength in use, while the end caps of more complex shape may be made of non-machined material because of the lower strength requirements thereof.

5 Claims, 5 Drawing Figures

PATENTED SEP 11 1973 3,758,176
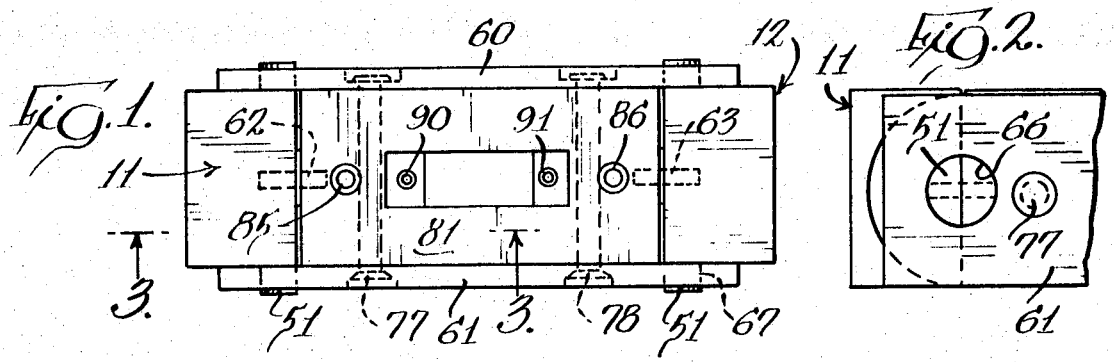
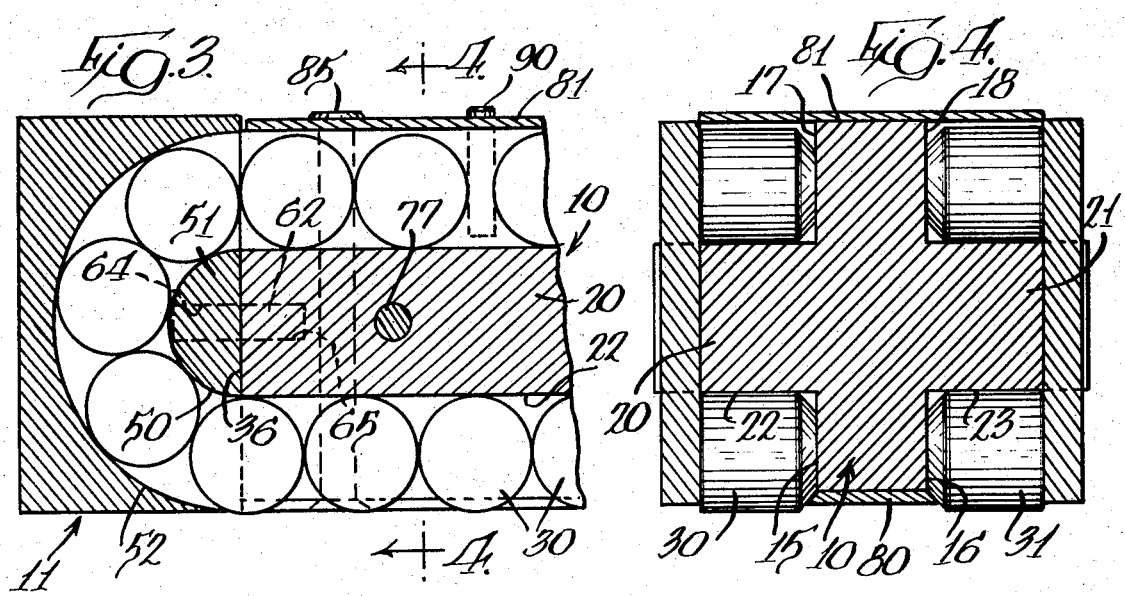
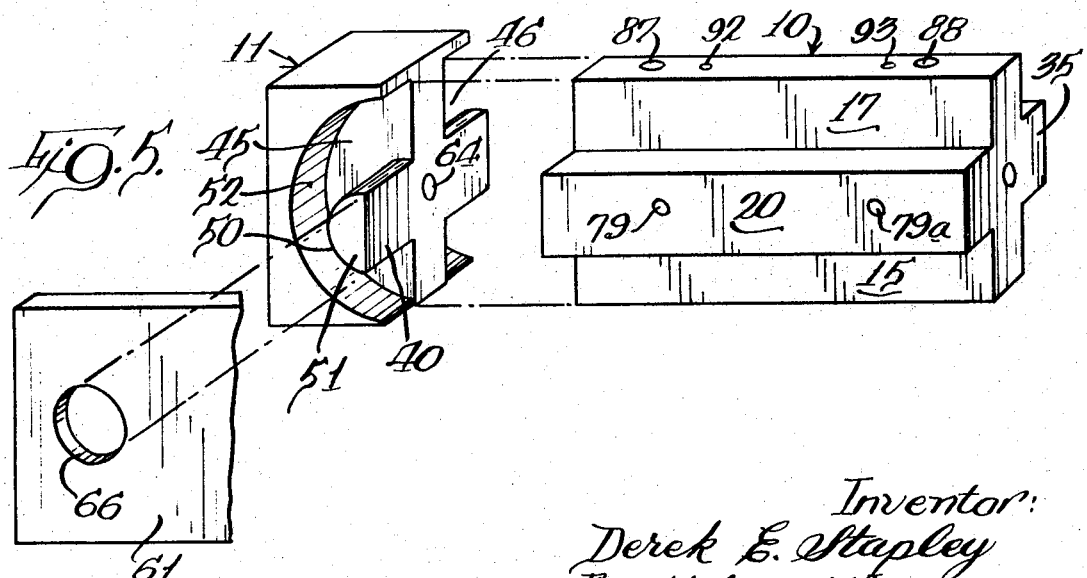
Inventor:
Derek E. Stapley
By Hofgren, Wegner,
Allen, Stellman & McCord
Attys

BEARING PACK

BACKGROUND OF THE INVENTION

This invention relates to bearing packs and, more particularly, to a roller bearing pack having cost reductions in the design by separating the body member having high strength requirements from the end caps having lower strength requirements. The body member is of a simple easily machined shape and the end caps having curved surfaces are manufactured from materials and by processes which enable the cost reductions.

The invention disclosed herein is an improvement on the structure disclosed in the application of Walter S. Swanson, Ser. No. 25093, filed Apr. 2, 1970, which is owned by the assignee of this application and the disclosure of said prior application is incorporated herein by reference for a more detailed description as to the utilization and mounting of such bearing pack.

SUMMARY

This invention relates to a new and improved bearing pack wherein the components thereof have been separated functionally between high strength and low strength requirements. The body member having the high strength requirement is of a shape to minimize the amount of expensive material used and the machining thereof. The components having lower strength requirements have the more complex shapes and can be manufactured of less expensive material and by less expensive methods to reduce the over-all cost of the bearing pack.

An object of this invention is to provide a bearing pack having a body member constructed to meet the strength requirements of the bearing pack and provide load bearing surfaces for the rolling elements of the bearing pack and with end caps secured to the body member having guide channels for completing the circuit path for the rolling elements and which have all the nonlinear surfaces required for the bearing pack whereby such surfaces can be formed as by molding or casting of a less expensive material, such as plastic, because of all the high load requirements being met by the body member.

Another object of the invention is to provide a bearing pack, as defined in the preceding paragraph, wherein the body member has a generally cross-shaped section with a lateral section having a lower surface defining a load-bearing surface for rolling elements in a load zone between the load-bearing surface and an adjacent machine tool way or the like and with the ends of the body member having planar faces to engage against similar planar faces of abutting end caps and with each end cap including a part forming a continuation of said lateral section of the body member and having a curved surface coacting with a correspondingly curved surface of the end cap spaced therefrom to define guide channels for the rolling elements beyond the ends of the load zone defined by the body member.

An additional object of the invention is to provide a bearing pack as defined in the preceding paragraphs wherein the end caps are held in secured relation with the body member by interfitting with a pair of side plates secured to the body member and retention members for the rolling elements are positioned at the top and the bottom of the body member in spanning relation between the end caps and secured to the body member to complete the bearing pack.

BRIEF DESCRIPTION OF THE DRAWING

FIG. 1 is a plan view of the bearing pack;

FIG. 2 is a fragmentary front elevation thereof;

FIG. 3 is a fragmentary vertical section on an enlarged scale of the bearing pack and taken generally along the line 3—3 in FIG. 1;

FIG. 4 is a vertical transverse section taken generally along the line 4—4 in FIG. 3; and FIG. 5 is an exploded fragmentary view of a body member, an end cap and a side plate of the bearing pack.

DESCRIPTION OF THE PREFERRED EMBODIMENT

The bearing pack has three primary components including a body member indicated generally at 10 and a pair of end caps indicated generally at 11 and 12. The body member 10 is formed as a cross-shaped member, with a central section having upright surfaces 15, 16, 17 and 18. The upright surfaces 15 and 16 are disposed beneath a lateral section of the body member having parts 20 and 21 extending laterally beyond the upright surfaces 15–18 of the central section. A pair of lower surfaces 22 and 23 of the lateral section parts 20 and 21 define load bearing surfaces for two circuits of rolling elements which, as shown, are roller bearings. A first circuit of roller bearings 30 are associated with the upright guide surfaces 15 and 17 of the body member 10 and with the load bearing surface 22 while a second series of roller bearings 31 are associated with the upright guide surfaces 16 and 18 of the central section and with the load bearing surface 23. As seen particularly in FIG. 3, there are a number of roller bearings along each path to, in effect, define two continuous circuits of roller bearing members with a plurality of bearings in a load zone defined between the load bearing surfaces 22 and 23 at the underside of the lateral section of the body member 10 and an adjacent structure of a machine tool way or the like (not shown).

The body member 10 has a pair of planar end faces 35 and 36 which terminate at the ends of the above-defined load zone.

The end caps 11 and 12 each have a cross-shaped planar end face, as shown at 40 for the end cap 11. This end cap face abuts against the end face 36 of the body member to form a continuation of the basic shape of the body member beyond the load zone. Each end cap has a pair of curved guide channels for guiding the rolling elements 30 and 31 between the load zone and an upper return path above the lateral section of the body member. The end cap 11 has the guide channels 45 and 46, with the guide channel 45 for the rolling elements 30 formed by a curved surface 50 on a part 51 of the end cap and a similarly curved surface 52 spaced therefrom.

The second guide channel for the rolling elements 31 has been indicated at 46 and it is formed by the structure similar to that for the guide channel 45. The end cap 12 is of the same construction as the end cap 11 to provide a second pair of guide channels for the rolling elements 30 and 31.

With the structure of the body member 10 and end caps 11 and 12, the body member 10 can be formed of high strength material and shaped for maximum strength and with machining thereof being along linear surfaces only. The more complex contours as required for the guide channels are positioned entirely within the end caps. The end caps are outside the load zone and do not have the high strength requirements of the body member. The material selected for the end caps can be chosen in conjunction with the manufacturing process thereabove to reduce the over-all cost of the bearing pack. As examples, the end caps can be molded to the shape shown out of a plastic, such as DELRIN, or formed from a die cast metal.

In assembly, the end caps 11 and 12 are secured to the body member 10 by interconnection with a pair of side plates 60 and 61 which are fastened to the body member 10. More specifically, each of the end caps 11 and 12 is aligned with opposite ends of the body member by roll pins 62 and 63 which fit into aligned openings in the body member and end cap, as shown at 64 and 65 respectively for receiving the roll pin 62. These roll pins provide accurate location of the end caps to the body member and the end caps are then secured to the body member by the side plates 60 and 61. Each of the side plates 60 and 61 has a length to partially span the end caps 11 and 12 and each has a pair of circular openings to receive lateral projections extending outwardly from the end cap. More particularly, the side plate 61 has the circular openings 66 and 67 to receive the lateral projections at one side of end caps 11 and 12 with the lateral projection for end cap 11 being the outer end of the part 51 of the end cap. The side plate 60 is of the same construction as the side plate 61 to receive the half round lateral projections extending from the opposite side of the end caps 11 and 12. The side plates 60 and 61 are then secured to the body member 10 by a pair of headed rivets 77 and 78 extending through openings in the side plates and also through passages 79 and 79a in the body member 10.

A plurality of retention members in addition to the side plates 60 and 61 are secured to the body member 10 and span the distance between the end caps 11 and 12 to provide complete retention of the rolling elements in the bearing pack. A bottom retainer strip 80 extends along the lower face of the central section of the body member 10 and has edge faces inclined upwardly and inwardly for coacting with similar shapes at the ends of the roller bearings 30 and 31 to confine the roller bearings within the pack while still permitting the roller bearings to extend beneath the level of the side plates 60 and 61 and the retainer strip 80 to be under load against a machine tool way or the like. A top retainer plate 81 extends across the width of the body member 10 and between the end caps 11 and 12 to close off the top of the bearing pack and retain the roller bearings. The retainer strip 80 and top retainer plate 81 are secured to the body member 10 by a pair of headed rivets 85 and 86 extending from top to bottom of the bearing pack and through a pair of passages 87 and 88, respectively, in the body member 10.

A pair of roll pins 90 and 91 extend into openings 92 and 93, respectively, in the body member 10, and assist in mounting the bearing pack in use thereof.

I claim:

1. A bearing pack having a cross-shaped body member with a central upright section defining upper and lower lateral guide surfaces for at least two laterally spaced circuits of rolling elements, and a lateral section extending beyond both sides of said central section intermediate the height thereof to have the lower surfaces thereof define load bearing surfaces for elements in a load zone between said bearing surfaces and an adjacent machine tool way or the like, the upper surfaces of said lateral section defining a part of a return path for said rolling elements, a pair of end caps secured one to each end of said body member and each having curved guide channels for guiding the rolling elements between the load zone and the upper return path each end cap having a pair of lateral projections, a pair of side plates having openings to receive said lateral projections, and means securing said side plates to said body member to hold the end caps in secured relation with the body member.

2. A bearing pack as defined in claim 1 wherein said end caps are formed of a moldable or castable material or the like such as plastic and said lateral projections are half-round.

3. A bearing pack having a cross-shaped body member with a central upright section defining upper and lower lateral guide surfaces for at least two laterally spaced circuits of rolling elements, and a lateral section extending beyond both sides of said central section inter-mediate the height thereof to have the lower surfaces thereof define load bearing surfaces for elements in a load zone between said bearing surfaces and an adjacent machine tool way or the like, the upper surfaces of said lateral section defining a part of a return path for said rolling elements, the opposite ends of said body member being planar end faces, a pair of one-piece end caps each having a planar end face to abut and coincide with a planar end face of the body member to form continuations of said lateral and central upright sections of the body member beyond said load zone, each of said end caps having a pair of curved guide channels formed integrally therein for guiding the rolling elements between the load zone and the upper return path and defined by a part of the end cap shaped to form a continuation of said body member sections with arcuate convex surfaces extending between the load zone and the upper return path and by concave curved surfaces spaced from the convex surfaces, and retaining elements for the rolling elements secured to the body member at the top, bottom and sides thereof.

4. A bearing pack as defined in claim 3 wherein said one-piece end caps are each formed of a moldable or castable material such as plastic.

5. A bearing pack as defined in claim 4 wherein said retaining elements include side plates, lateral extensions on each of said end caps, and openings in said side plates to receive said lateral projections and secure the end caps to the body member.

* * * * *